United States Patent

[11] 3,600,511

[72] Inventor John Andrew Cooksey
Indianapolis, Ind.

[21] Appl. No. 838,988
[22] Filed July 3, 1969
[45] Patented Aug. 17, 1971
[73] Assignee RCA Corporation

[54] APPARATUS FOR CONTROLLING THE OPERATING POTENTIAL OF A VIDICON
8 Claims, 4 Drawing Figs.

[52] U.S. Cl. .......... 178/7.2
[51] Int. Cl. .......... H04n 5/19
[50] Field of Search .......... 178/7.2, DIG. 26, DIG. 29, 7.1

[56] References Cited

UNITED STATES PATENTS

| | | | |
|---|---|---|---|
| 2,978,537 | 4/1961 | Kruse, Jr. et al. | 178/7.2 E |
| 3,086,077 | 4/1963 | Maver | 178/7.2 E |
| 3,102,924 | 9/1963 | Legler | 178/7.2 E |
| 3,206,547 | 9/1965 | Leitich et al. | 178/7.2 E |
| 3,315,034 | 4/1967 | White | 178/7.2 E |
| 3,445,590 | 5/1969 | Dischert et al. | 178/7.2 E |

*Primary Examiner*—Robert L. Griffin
*Assistant Examiner*—John C. Martin
*Attorney*—Eugene M. Whitacre

ABSTRACT: The video signal derived from a vidicon target electrode, after preamplification, is applied to the control gate input electrode of a field effect transistor where it is clamped by a pair of diodes and where combined horizontal and vertical blanking pulses are added to it by another diode at the transistor drain electrode and a pedestal component derived from a pedestal control circuit is added at the transistor source electrode to produce a clamped composite signal. The composite signal is clipped at a fixed level by a series diode coupled between the drain electrode of the field effect transistor and the base electrode of an emitter follower transistor, the emitter electrode being coupled to an output amplifier and to the input transistor of a peak detector including a diode and a second field effect transistor, the source output electrode of which is coupled to a transistor which supplies the operating potential for the vidicon target electrode through a coupling circuit comprising a capacitor and having a first branch including a relatively small value resistor and a diode which is forward biased for operating potential decreases, thereby forming with the capacitor a short time constant, fast reacting circuit; the coupling circuit having a second branch including a relatively large value resistor which forms with the capacitor a long time constant, slow recovery circuit for operating potential increases which reverse bias the diode. The vidicon target electrode operating potential also is applied to the input gate electrode of a third field effect transistor having an output source electrode which is coupled to the pedestal control circuit.

INVENTOR
John A. Cooksey
BY Eugene M. Whitacre
ATTORNEY

INVENTOR.
John A. Cooksey
BY
Eugene M. Whitacre
ATTORNEY

APPARATUS FOR CONTROLLING THE OPERATING POTENTIAL OF A VIDICON

BACKGROUND OF THE INVENTION

In a television system the peak-to-peak amplitude of a given video signal derived from a pickup tube of the photoconductive type and representative of a subject is dependent upon a number of actors including the light level at which the subject is illuminated. The light level is not always controllable, such as in outdoor pickups or when the subject is a film. One of the expedients employed to maintain a substantially constant video signal level under varying light levels of subject illumination is to automatically vary the operating potential of the photoconductive signal producing electrode of the pickup tube in response to a control signal derived from the video signal.

In some cases it is desirable to sue an electron beam for scanning the video signal producing electrode which has a constant relatively low intensity. Such a beam is incapable of discharging those electrode areas corresponding to highlights of the subject under conditions where the subject illumination is materially increased unless the operating potential of the electrode is decreased. When the subject illumination increases suddenly, it is necessary to decrease the electrode operating potential quickly and without any oscillation thereof which would be undesirably reflected in the video signal.

In those systems in which the photoconductive pickup tube is a vidicon type, for example, another problem is encountered. Such a pickup tube produces a so-called "dark current" signal component even in the absence of any illumination of the video signal producing electrode. Normally, under adequate subject illumination conditions, the dark current signal is so small relative to the video signal that it can be tolerated. When the operating potential of the signal producing electrode is increased in response to a control signal indicative of a decreased illumination of the subject to restore the video signal to its former level, the dark current signal, which does not decrease with a decrease of subject illumination, effectively increases with the increase of the electrode operating potential. When this happens the undesired dark current signal becomes so large in relation to the desired video signal that it cannot be tolerated. It, therefore, is necessary to prevent, or at least minimize, such an increase of the dark current signal.

It is customary, in the composition of a television video signal, to provide a so-called "pedestal" component which is defined in the book entitled "TELEVISION ENGINEERING HANDBOOK" by Donald G. Fink and published in 1957 by McGraw Hill Book Company as "that waveform portion between camera black and the clipping level." In some television video signal generating systems it is the practice not only to clamp the video signal derived from the pickup tube at some fixed reference potential but also to establish a fixed clipping level for the signal in the vicinity of the camera black signal level. The magnitude of the dark current signal component derived from the photoconductive pickup tube is related in a general way to the pedestal amplitude. An increase of the operating potential of the video signal producing electrode of the pickup tube, in a system having a fixed clipping level for a clamped video signal, produces an increase of the pedestal amplitude and, hence, an undesired increase of the dark current signal component relative to the desired video signal.

It, therefore, is an object of this invention to provide a novel automatic control system for a photoconductive type of television pickup tube by which to maintain a substantially constant video signal level under varying illumination levels of a subject without producing any significant change of the dark current signal.

In accordance with the invention, a first control signal is developed having an amplitude which varies directly with peak amplitude changes of a clamped video signal resulting from variations of the illumination level of a subject. This control signal is used to vary the operating potential impressed upon the signal producing electrode of a photoconductive pickup tube from which the video signal is derived. The operating potential of the electrode is varied inversely to the amplitude variations of the first control signal and is impressed upon the electrode by means including a coupling circuit which has a relatively fast reaction time for applying decreasing operating potentials to the electrode, thereby enabling a rapid application of a decreased operating potential to effect the discharge of those electrode areas corresponding to subject highlights and obviating any tendency for the operating potential to oscillate.

The clamped video signal is clipped at a fixed voltage for all levels of subject illumination. Consequently, in accordance with another aspect of the invention, the operating potential for the video signal producing electrode of the pickup tube is used as a second control signal to vary the magnitude of the pedestal component added to the video signal inversely to amplitude variations of the second control signal, thereby effectively maintaining a substantially constant amplitude of the dark current signal component relative to the desired video signal under all subject illumination levels.

For a more specific disclosure of the invention, reference may be had to the following detailed description of an illustrative embodiment which is given in conjunction with the accompanying drawings, of which:

Figure 1:
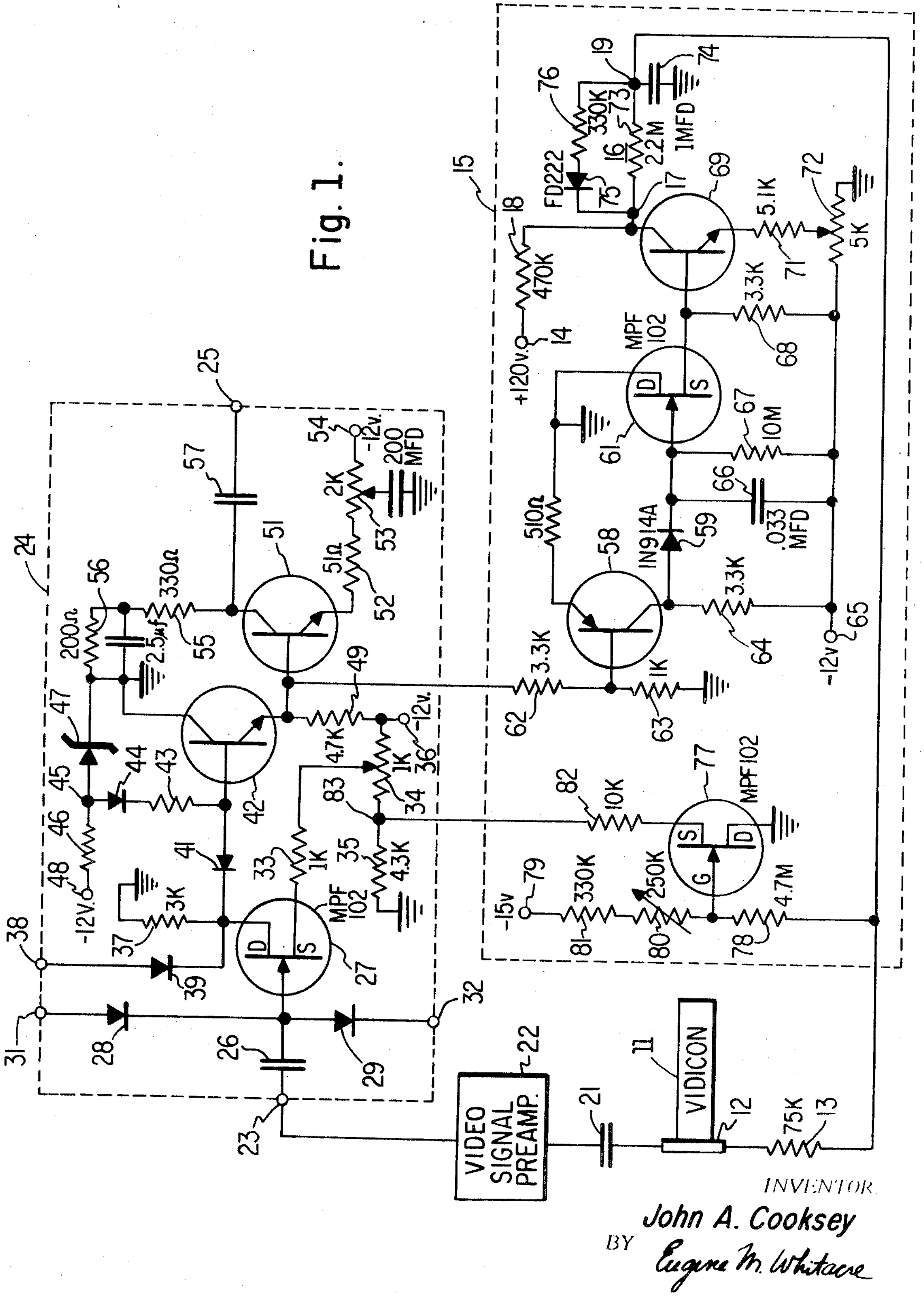
FIG. 1 is a schematic circuit diagram of that portion of a television video signal generating and processing system embodying the invention.

In FIG. 1 the television pickup tube having a photoconductive video signal producing electrode is a vidicon 11, the target electrode 12 of which produces a video signal representative of the light received from a subject (not shown). Operating potential is impressed upon the target electrode 12 through a series connected resistor 13 from a voltage source at a terminal 14 of an automatic target and pedestal control apparatus 15 by way of a coupling circuit 16 having an input terminal 17 connected to the terminal 14 through a resistor 18, and an output terminal 19 connected to the resistor 13. The details and operation of the coupling circuit will be described subsequently. The video signals produced at the target electrode 12 of the vidicon 11 are coupled by means including a capacitor 21 to the input of a video signal preamplifier 22, the output of which is connected to the video signal input terminal 23 of video signal processing apparatus 24.

The processing apparatus 24 includes facilities for clamping the video signal, adding a pedestal component and blanking pulses to it, clipping and amplifying the resultant signal so as to produce a desired video signal at an output terminal 25. The video signal at the input terminal 23 is impressed by way of a coupling capacitor 26 upon the gate electrode G of an insulated gate field effect transistor (FET) 27, upon which also are impressed positive and negative going clamping pulses through diodes 28 and 29 and derived respectively from clamping pulse input terminals 31 and 32. With a video signal impressed upon the input terminal 23 in which white subject areas are represented by positive going portions of the signal and black subject areas by negative going signal portions, the circuit of FIG. 1 effectively clamps the video signal during horizontal retrace intervals at a negative voltage of approximately 10 volts. Also, a pedestal component is added to the clamped video signal by means of a circuit connected to the source electrode S of the transistor 27. The pedestal inserting circuit includes a series resistor 33 connected from the source electrode S to a negative voltage supply comprising a master pedestal setting potentiometer 34 and a resistor 35 connected between a negative voltage terminal 36 and ground. The DC level of the video signal developed in the output circuit of the transistor 27, which includes a load resistor 37 connected from the drain electrode D and ground, the determined during normal operation by the adjustment of the master pedestal setting potentiometer 34 and, in the particular circuit of FIG. 1, the video signal DC level is established at a negative potential of approximately 4 volts. Additionally a mixed horizontal and vertical blanking signal present at a blanking signal input terminal 38 is added to the clamped video signal through a diode 39 connected to the output drain electrode D of the transistor 27.

The clamped video signal, with pedestal and blanking components added to it as described, is derived from the output drain electrode D of the transistor 27 in opposite polarity to the input video signal so that white subject areas are represented by negative going video signals. Such an output video signal is coupled by a diode 41 from the drain electrode of an emitter follower NPN transistor 42. The base electrode of the transistor 42 is maintained at a constant potential which determines the level at which the video signal is clipped. This constant potential is produced by a series connection of a resistor 43 and a diode 44 to a constant potential point 45 of a voltage divider comprising a series arrangement of a resistor 46 and a Zener diode 47 between a negative voltage terminal 48 and ground. In the circuit of FIG. 1 the constant potential at the base electrode of the transistor 42 is substantially a negative voltage of 4 volts. Thus, the video signal developed at the emitter electrode of the transistor 42, across an emitter resistor 49 connected to the negative voltage terminal 36, is clipped as described so that it includes only the desired subject representative video signal component, the relatively small but undesired dark current component and the added pedestal component.

Such a composite signal is impressed upon the base electrode of an amplifier NPN transistor 51, the emitter electrode of which is connected through a resistor 52 and a gain adjusting potentiometer 53 to a negative voltage terminal 54, and the collector electrode of which is connected to ground through load resistors 55 and 56. The amplified composite signal developed at the collector electrode of the amplifier transistor 51 is coupled by means including a capacitor 57 to the output terminal 25 of the processing apparatus 24.

In order to compensate for varying levels of the illumination of a given subject, whereby to maintain a substantially constant video signal level, the composite signal derived from the emitter electrode of the transistor 42 included in the video signal processing apparatus 24 is applied to a peak detector of the automatic target and pedestal control apparatus 15. This peak detector comprises an input PNP transistor 58, a diode 59 and an output insulated gate field effect transistor 61. The clamped composite signal at the emitter electrode of the transistor 42 is impressed in suitable amplitude upon the base electrode of the peak detector input transistor 58 by a voltage divider circuit including resistors 62 and 63 referenced to ground with their junction point being directly coupled to the transistor 58 base electrode. The inverted polarity composite signal produced at the collector electrode of the peak detector input transistor 58 across a load resistor 64, connected to a negative voltage terminal 65, is peak detected relative to the signal-clamping level by the diode 59. The detected signal is filtered by a shunt connected capacitor 66 and resistor 67 and is impressed upon the gate electrode of the output transistor 61 of the peak detector.

The output transistor 61 of the peak detector is connected as a source follower with its source electrode S connected through a load resistor 68 to the negative voltage terminal 65 and with its drain electrode D grounded. The unidirectional peak video signal representative voltage developed at the source electrode S of the transistor 61 constitutes a first control signal which is impressed upon the base electrode of an NPN amplifier and target electrode operating potential developing transistor 69. The emitter electrode of the transistor 69 is connected through a resistor 71 to a potentiometer 72 which is connected between the negative voltage terminal 65 and ground, and serves to control the average target voltage developed across resistor 18 and coupled to pickup tube 11. By means of the connection of the collector electrode of the transistor 69 to the positive voltage terminal 14 through the resistor 18, a target electrode operating potential is applied to the input terminal 17 of the coupling circuit 16. Any variation of the amplitude of the first control signal applied to the base electrode of the transistor 69 inversely varies the potential developed at the collector electrode of this transistor. The impression of such potential upon the coupling circuit input terminal 17 serves to similarly vary the operating potential applied to the target electrode 12 of the vidicon 11 which is connected as previously described to the output terminal 19 of the coupling circuit 16.

The coupling circuit 16 comprises a relatively large value resistor 73 connected between the input and output terminals 17 and 19 and forming a coupling path having a relatively long time constant with a capacitor 74 connected between the output terminal 19 and ground. The coupling circuit also includes a series connection of a diode 75 and a relatively small value resistor 76 connected between the input and output terminals 17 and 19 and forming a coupling path having a relatively short time constant with the capacitor 74.

The automatic target and pedestal control apparatus 15 also includes a pedestal control circuit comprising an insulated gate field effect transistor 77, the gate electrode G of which is connected to the output terminal 19 of the coupling circuit 16 through a coupling resistor 78 and to a negative voltage terminal 79 through an adjustable automatic pedestal control resistor 80 and a fixed resistor 81. The drain electrode D of the automatic pedestal control transistor 77 is grounded and its source electrode S is connected through a resistor 82 to the junction point 83 between the master pedestal setting potentiometer 34 and the resistor 35 of the video signal processing apparatus 24 so as to effect automatic control of the pedestal amplitude in a manner to be described presently.

In operation of the video signal processing apparatus 24 and of the automatic target and pedestal control apparatus 15 the various adjustable controls are set for a normal illumination of the subject to provide a video signal having a normal level representative of the white, gray and black areas of the subject. In such a case a normal value of operating potential is impressed upon the target electrode 12 of the vidicon 11 from the terminal 14 through the resistor 18, the coupling circuit 16 and the resistor 13. Should the subject illumination decrease, the video signal level will decrease, the detection of which by the peak detector including the diode 59 of the control apparatus 15 will produce a decrease of the first control signal. This signal will decrease conduction through the amplifier transistor 69, thereby increasing the positive operating potential applied to the target electrode 12 of the vidicon 11. With proper circuit parameters, such as those illustrated in FIG. 1, the increased operating potential of the target electrode will be effective to maintain the video signal at the output terminal 25 of the processing apparatus 24 at substantially its normal level. In a similar manner an increase of subject illumination will automatically decrease the operating potential of the target electrode to maintain substantially normal video signal level.

It is well known, however, as exemplified in U.S. Pat. No. 3,180,934 granted to M. Altman et al. on Apr. 27, 1965, that an increase of the positive operating potential of the target electrode 12 of the vidicon 11 not only produces the desired increase of the video signal component but also produces an undesired increase of the dark current component of the signal derived from he vidicon. Such an increase in the dark current component increases the effective black level of the resultant signal relative to the pedestal component set by the adjustment of the master potentiometer 34 of the processing apparatus 24. By definition the pedestal component of the signal is that portion which extends from the black representative signal derived from the camera pickup tube to the signal level at which it is clipped. In the arrangement of FIG. 1 the clipping level is fixed by the described constant potential applied to the base of the transistor 42 and to the diode 41. Hence, in order to maintain the proper signal relationship to the fixed clipping level it is necessary to decrease the pedestal component. This is accomplished according to this invention by the described application of the increased positive target operating potential also to the gate electrode G of the pedestal control transistor 77 as a second control signal. This signal controls the transistor so that the current flow in its source electrode resistor 82 effectively adjusts the voltage supplied by the master pedestal setting potentiometer 34 to decrease substantially to its original value the pedestal component of the signal developed at the output drain electrode D of the transistor 27.

A salient feature of the invention is the character of the coupling circuit 16 of the automatic target and pedestal control apparatus 15. This circuit has a relatively fast reaction time when it is desired to reduce the target operation potential of the vidicon for an increase in the illumination of the subject, particularly when the illumination increase is an abrupt one. The coupling circuit also has a relatively slow recovery time when it is desired to increase the target operating potential for a decrease in the subject illumination. Such a characteristic of the coupling circuit is achieved by providing it with a relatively short time constant for decreases of the target operating potential and a relatively long time constant for increases of the target operating potential. The longer time constant in response to decreasing illumination is desirable in order that the effects of a deliberate fadeout from one scene to another or the switching off of a scene light are not cancelled. When the voltage at the collector electrode of the amplifier transistor 69, which is applied to the target 12 of the vidicon 11 as its operating potential, tends to decrease, the diode 75 is forward biased so that the time constant of the coupling circuit 16 is short as determined by the value of the capacitor 74 and the relatively small value of the resistor 76. When the voltage at the collector electrode of the transistor 69 tends to increase, the diode 75 is back biased so that the time constant of the coupling circuit is long as determined by the value of the capacitor 74 and the relatively large value of the resistor 73.

Figure 2A:
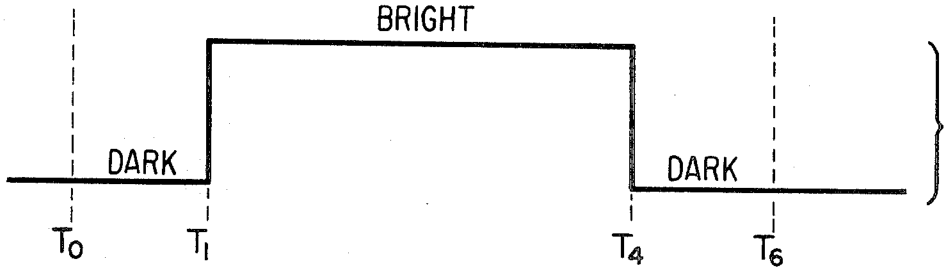
FIG. 2A represents light level changes to which a subject may be exposed.
Figure 2B:
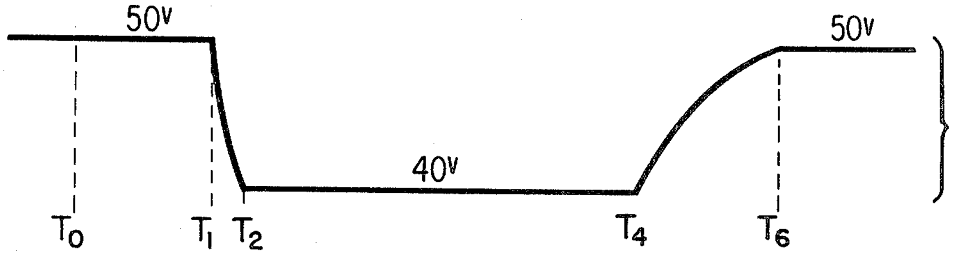
FIG. 2B illustrates typical operating potential variations of the video signal producing electrode which are automatically effected by means of the invention in response to the light level changes of FIG. 2A.
Figure 2C:
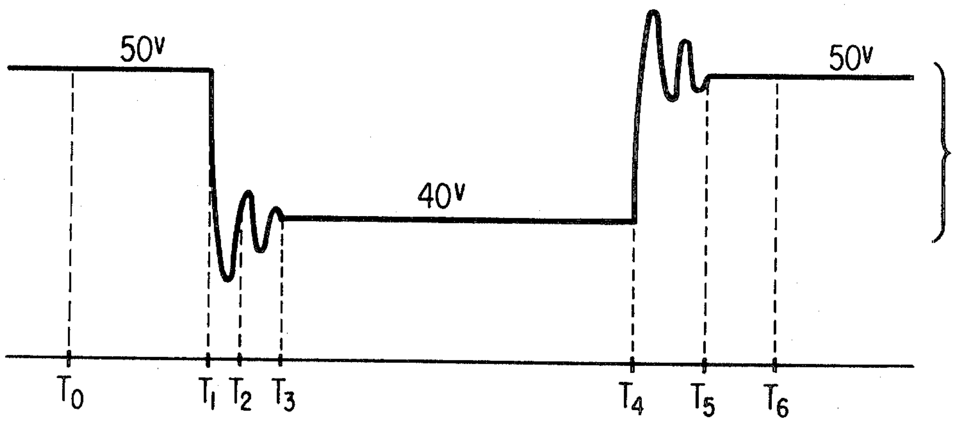
FIG. 2C illustrates the oscillatory condition produced if the rapid changes of the operating potential were to be attempted without the benefit of the present invention.

This characteristic of the coupling circuit is illustrated by the waveforms of FIG. 2. It is assumed that, at time $T_0$, the subject illumination is relatively dark as shown in FIG. 2A and that the operating potential of the vidicon target electrode 12 is relatively high, e.g., 50 volts as shown in FIG. 2B. At time $T_1$, when the subject illumination is assumed to become relatively bright as shown in FIG. 2A, the automatic target control apparatus 15 operates, in response to its detection of an increased video signal level, to reduce the target electrode operating potential to a lower value, e.g., 40 volts. FIG. 2C illustrates an undesirable oscillatory effect which may occur if the target voltage were suddenly dropped from the illustrated 50 volt level to a 40 volt level. If such a reduced voltage were to be suddenly applied directly to the target electrode, the effective target electrode operating potential, and the amplitude of the resultant video signal, would oscillate until the desired steady state 40 volt target potential is attained at the later time $t_3$. Any tendency to oscillate is prevented, in accordance with this invention, by the damping action of the time constant portion of the coupling circuit 16 including the diode 75, resistor 76 and capacitor 74. The short time constant portion of the coupling circuit 16 including the relatively small value resistor 76 enables the target operating potential of the vidicon 11 to be decreased without oscillation to the desired 40 volt value in the time of $(T_2—T_1)$ as shown in FIG. 2B and which, in the circuit of FIG. 1, is approximately 0.3 seconds. Experience with the circuit of FIG. 1 has indicated that such time is sufficiently short to enable the discharge of subject representative high light target areas, even by a scanning beam of constant relatively low intensity, without producing objectionable distortion of the video signal.

A change from relatively bright to relatively dark illumination of the subject at time $T_4$ in FIG. 2 produces a decreased video signal level to which the control circuit 15 of FIG. 1 responds to increase the operating potential of the target 12 of the vidicon 11 from 40 volts to 50 volts, for example. Such an increase, if suddenly effected, would again produce an oscillation of the target operating potential, such as that shown in the waveform of FIG. 2C, which would not reach the steady state value of 50 volts until time $T_5$ were it not for the coupling circuit 16. Because, under such conditions, the problem of undischarged areas of the vidicon target electrode 12 representing subject highlights does not arise, it is unnecessary to increase the target operating potential as rapidly as it is desirable to decrease it as previously describe. Therefore, the target-operating potential increase from 40 volts to 50 volts, which is produced at the input terminal 17 of the coupling circuit 16, is applied to the target electrode 12 through the long time constant portion of the coupling circuit including the resistor 73 because, under these conditions, the diode 75 is back biased, thereby rendering inoperative the short time constant portion of the coupling circuit. As illustrated in FIG. 2B the vidicon target operating potential is gradually increased from 40 volts to 50 volts in the time of $(T_6—T_4)$ which, in the circuit arrangement of FIG. 1, is approximately 2.0 seconds.

Another feature of the invention is the maintenance of a fixed clipping level of the composite signal including, in addition to a clamped video signal, a pedestal portion and horizontal and vertical blanking pulses. With the fixed clipping level the automatic adjustment of the pedestal portion of the signal relative to the clipping level prevents an increase of the dark current signal component when the vidicon target electrode operating potential is increased for relatively low illumination levels of he subject. An advantage of such an automatic pedestal voltage change, as embodied in the circuit of FIG. 1, is that it allows the adjustment of the master pedestal control potentiometer 34, of the signal processing apparatus 24, to set the desired pedestal for conditions of normal average illumination of the subject. A suitable adjustment of the automatic pedestal control resistor 80, of the automatic control apparatus 15, relative to the adjustment of the master pedestal control potentiometer 34 and the associated circuit parameters enable the automatic pedestal apparatus to track over the entire range of target electrode operating potential variations. Hence, no additional manual adjustment of the pedestal voltage need be made while the apparatus is in operation.

Still another feature of the invention is the particular character of the peak detector used in the control apparatus 15. Because of the DC coupling of the video signal from the gate electrode G of the processing apparatus transistor 27 to the control apparatus detector diode 59 only white representative signal peaks relative to the clamping level are detected. The application of the detected output of the diode 59 and the filter capacitor 66 and resistor 67 to the source follower transistor 61 provides a relatively high impedance load for the detector. The direct current first control signal which is applied to the amplifier transistor 69, therefore, is maintained at a substantially constant level for any given peak value of the clamped video signal applied to the input transistor 58 of the control apparatus 15.

The disclosed illustrative embodiment of the invention not only varies the operating potential of the target electrode o a photoconductive pickup tube automatically to maintain a substantially constant peak amplitude relative to a clamping level of a video signal representative of a subject under varying levels of illumination, but also automatically varies the signal pedestal relative to a fixed clipping level so as to prevent an increase of the dark current signal component when the target electrode operating potential is increased. The system of the invention represents a material improvement over prior art systems by reason of its ability to react rapidly when sudden increases of the subject illumination occur, thereby effectively preventing the creation of any undischarged areas of the photoconductive target electrode corresponding to highlights of the subject and which, if allowed to exist for any appreciable time period would produce an undesired distorted video signal which would be commercially unacceptable.

What I claim is:

1. In a television system including a pickup tube having a photoconductive video signal producing electrode, an automatic control system for said pickup tube comprising:

control signal developing means for producing, from said video signal derived from said pickup tube electrode, a first control signal having an amplitude varying directly with amplitude changes of said produced video signal resulting from variations of said subject illumination;

voltage-developing means responsive to said variable amplitude first control signal for developing a video signal producing electrode operating potential varying in magnitude inversely to amplitude variations of said first control signal; and means including a coupling circuit having an input terminal coupled to said voltage developing means and an output terminal coupled to said pickup tube electrode for applying said operating potential to said electrode, said coupling circuit having a relatively fast reaction time in applying magnitude decreases of said developed operating potential to said pickup tube electrode and a relatively slow recovery time in applying magnitude increases of said developed operating potential to said pickup tube electrode.

2. A television pickup tube automatic control system as defined in claim 1, wherein:

said coupling circuit comprises a diode, capacitor and resistor network having a relatively short time constant in response to said decreases of said developed operating potential and a relatively long time constant in response to said increases of said developed operating potential.

3. A television pickup tube automatic control system as defined in claim 2, wherein:

said network comprises a capacitor connected to said output terminal effectively in shunt with said pickup tube video signal producing electrode;

a first resistor connected between said output and input terminals of said network; and a second resistor and a diode connected in series between said input and output network terminals.

4. A television pickup tube automatic control system as defined in claim 3, wherein:

said second resistor has a relatively small value;

said diode is connected in such polarity that it is forward biased in response to increases of said first control signal amplitude which produce decreases in the operating potential of said pickup tube video signal producing electrode, thereby providing said network with said relatively short time constant and enabling said fast reaction time in decreasing said operating potential of said pickup tube electrode for amplitude increases of said video signal, said diode being reverse biased in response to decreases of said first control signal amplitude; and said second resistor has a relatively large value, thereby providing said network with said relatively long time constant and enabling said slow recovery time in increasing said operating potential of said pickup tube electrode for amplitude decreases of said video signal.

5. A television pickup tube automatic control system as defined in claim 4, wherein;

a composite signal is derived from the photoconductive signal-producing electrode of said pickup tube including the subject representative video signal component and a dark current component which is produced even in the absence of any illumination of said electrode;

pedestal-inserting means for adding to said composite signal a pedestal component having a normal amplitude equal to the difference between said composite signal representing subject black and including said dark current component under normal subject illumination and a clipping level, said dark current component and, hence, said pedestal component amplitudes varying directly with variations of said operating potential of said pickup tube electrode;

clipping means coupled to said pedestal inserting means for clipping said composite signal obtained therefrom at said clipping level; and automatic pedestal amplitude-controlling means responsive to a second control signal derived from said pickup tube electrode operating potential for varying said pedestal component amplitude inversely to said electrode-operating potential variations to restore said pedestal component substantially to its normal amplitude, thereby effectively nullifying said dark current component amplitude variations.

6. A television pickup tube automatic control system as defined in claim 5, wherein:

said pedestal-inserting means includes normal amplitude-controlling means comprising a potentiometer and a fixed resistor connected as a first voltage divider to a source of unidirectional potential, said potentiometer being adjusted to establish said normal pedestal component amplitude; and said automatic pedestal amplitude controlling means comprising a transistor having an input electrode connected for response to said second control signal and an output electrode connected to the junction point of said potentiometer and said fixed resistor of said pedestal inserting means to effectively alter the adjustment of said potentiometer, thereby changing the amplitude of said pedestal component.

7. A television pickup tube automatic control system as defined in clam 6, wherein:

said second control signal is derived from said pickup tube electrode operating potential by means comprising a second voltage divider connected to the output terminal of said coupling circuit to said pickup tube electrode and including a variable resistor and at least one fixed resistor; and means including said variable resistor and at least one fixed to establish the amplitude of said second control signal.

8. A television pickup tube automatic control system as defined in claim 7, and additionally including;

means for clamping said signal derived from said pickup tube electrode at a predetermined voltage level; and means for peak detecting said signal relative to said clamping level to develop said first control signal.

UNITED STATES PATENT OFFICE
CERTIFICATE OF CORRECTION

Patent No. 3,600,511 Dated August 17, 1971

Inventor(s) John A. Cooksey

It is certified that error appears in the above-identified patent and that said Letters Patent are hereby corrected as shown below:

Column 1, line 10, that portion reading "actors" should read -- factors --; line 20, that portion reading "sue" should read -- use --.
Column 2, line 10, that portion reading "electrode," should read -- electrode --; line 10, after "electrode," and before "thereby" insert -- and a relatively slow recovery time for applying increasing operating potentials to the electrode, --.
Column 3, line 8, that portion reading "the" should read -- is --; line 22, after "electrode" and before "of an emitter" insert -- D of the transistor 27 to the base electrode --.
Column 4, line 74, that portion reading "he" should read -- the --.
Column 5, line 66, that portion reading "$t_3$" should read -- $T_3$ --.
Column 6, line 18, that portion reading "describe" should read -- described --; line 38, that portion reading "he" should read -- the --; line 67, that portion reading "o a" should read -- of a --.
Column 8, line 47, that portion reading "clam" should read -- claim --; line 54, delete that portion reading "and at least one fixed".

Signed and sealed this 21st day of March 1972.

(SEAL)
Attest:

EDWARD M.FLETCHER,JR.
Attesting Officer

ROBERT GOTTSCHALK
Commissioner of Patents